United States Patent [19]
Erhart

[11] Patent Number: 5,491,372
[45] Date of Patent: Feb. 13, 1996

[54] ELECTRIC LINEAR ACTUATOR WITH PLANETARY ACTION

[75] Inventor: Timothy A. Erhart, Chanhassen, Minn.

[73] Assignee: Exlar Corporation, Chanhassen, Minn.

[21] Appl. No.: 125,495

[22] Filed: Sep. 22, 1993

Related U.S. Application Data

[63] Continuation of Ser. No. 999,463, Dec. 29, 1992, abandoned, which is a continuation of Ser. No. 775,113, Oct. 11, 1991, abandoned.

[51] Int. Cl.$^6$ ............................. H02K 7/06; H02K 7/10
[52] U.S. Cl. ............................................. 310/80
[58] Field of Search ............................ 310/80, 83, 20; 74/424.7, 424.8 C

[56] References Cited

U.S. PATENT DOCUMENTS

| Re. 33,910 | 5/1992 | Compton | 318/687 |
|---|---|---|---|
| 511,679 | 12/1893 | Buckley | 74/424.8 C |
| 1,279,346 | 9/1918 | Hultgren et al. | |
| 2,683,379 | 7/1954 | Strandgren | 74/424.8 |
| 3,128,634 | 4/1964 | Eastman | 74/424.8 C |
| 3,159,758 | 12/1964 | Hemperly, Jr. | |
| 3,406,584 | 10/1968 | Roantree | 74/424.7 C |
| 3,595,094 | 7/1971 | Lemor | 74/424.8 C |
| 3,660,704 | 5/1972 | Paine et al. | 310/80 |
| 4,276,003 | 6/1981 | Perkins et al. | 417/415 |
| 4,277,706 | 7/1981 | Isaacson | |
| 4,337,671 | 7/1982 | Ulf | 74/424.8 C |
| 4,493,614 | 1/1985 | Chu et al. | 417/415 |
| 4,521,707 | 6/1985 | Baker | |
| 4,576,057 | 3/1986 | Saarl | |
| 4,601,640 | 7/1986 | Sommer | 417/415 |

(List continued on next page.)

FOREIGN PATENT DOCUMENTS

| 0053883 | 6/1982 | European Pat. Off. | |
| 2668206 | 4/1992 | France | |
| 3938353 | 5/1990 | Germany | |
| 17392 | 5/1907 | Norway | 417/415 |
| 2091375 | 7/1982 | United Kingdom | 74/424.8 C |
| 9012962 | 11/1990 | WIPO | |

OTHER PUBLICATIONS

Patent Abstracts of Japan vol. 8, No. 111 (E–246) 24 May 1984 & JP,A,59 025 543 (Sutaa Seiki) 9 Feb. 1984.
De Charette, *Comparing Ball and Roller Screws*, Machine Design, pp. 119–123 (Sep. 11, 1980).
Lemor, *Planetary Roller Screws—Expanding the limits of linear actuators*, Machine Design, pp. 69–72 (Feb. 25, 1988).
SKF planetary and recirculating rollers screws product literature *(1990)*.
*Electric Linear Actuators & Controls* product literature, Industrial Devices Corporation (1990).
Abstract for Patent No. 717,396, USSR, deated Feb. 1980.
Abstract for Patent No. 55-123382, Japan, dated Sep. 1980.

*Primary Examiner*—Peter S. Wong
*Attorney, Agent, or Firm*—Merchant, Gould, Smith, Edell, Welter & Schmidt

[57] ABSTRACT

The present invention provides an electrically powered linear actuator including an actuator assembly (having an actuator rod and a thread engaging portion), a motor assembly (having a stator) and a housing assembly. An elongated cylinder formed of a magnetic material is rotatably supported relative to the housing assembly. Magnets or other elements are mounted about an outer circumference of the cylinder to form an armature within the motor assembly. The elongated cylinder of the armature further includes an internally threaded bore. The thread engaging portion of the actuator assembly is moved along the threaded extent of the cylinder on rotation of the cylinder. Thus, the cylinder functions as an armature drive cylinder. The stator is selectively energized to rotate the armature drive cylinder clockwise or counterclockwise to reciprocally move the thread engaging portion of the actuator assembly and the output shaft. The threaded bore of the cylinder is significantly longer than the thread engaging portion of the actuator assembly such that the difference therebetween defines an actuation stroke for the device.

20 Claims, 6 Drawing Sheets

U.S. PATENT DOCUMENTS

| | | | |
|---|---|---|---|
| 4,723,941 | 2/1988 | Thistle et al. | 417/415 |
| 4,964,314 | 10/1990 | Wilkes | 74/424.8 |
| 5,041,748 | 8/1991 | Huber | 310/80 |
| 5,053,685 | 10/1991 | Bacchi | 310/80 |
| 5,117,700 | 6/1992 | Trechsel | 74/89 |
| 5,192,001 | 3/1993 | Bianco | 417/415 |
| 5,312,233 | 5/1994 | Tanny et al. | 417/415 |
| 5,391,953 | 2/1995 | van der Veen | 310/80 |

ELECTRIC LINEAR ACTUATOR WITH PLANETARY ACTION

This is a continuation of application Ser. No. 07/999,463, filed Dec. 29, 1992, which was abandoned upon the filing hereof, which is a continuation of 07/775,113, filed Oct. 11, 1991, which was abandoned.

BACKGROUND OF THE INVENTION

The present invention relates to linear actuators and, in particular, to an electrically powered linear actuator.

Devices which provide a reciprocating motion through an actuator member as that member is moved through an actuation stroke are known to the prior art. Such actuators may be fluid powered—hydraulically or pneumatically—or electrically powered. An advantage to a hydraulic powered actuator is that it provides high linear forces in an extremely small package, typically cylinder/piston arrangement. Hydraulic systems, no matter how well maintained, leak fluid contributing to an ever growing environment problem. While achievable, computer control of a hydraulic cylinder actuator involves substantial complexity. Pneumatic driven actuators, while clean, are nearly impossible to place under electronic control due to air's compressibility.

An electric motor, which may be employed to develop the fluid power for the fluid systems described above, is a highly efficient and reliable system for delivering usable power. In the context of a fluid system, however, much of the efficiency is lost in the generation of the fluid power. Additionally, computer control of an electric motor is relatively simple. For this and other reasons mentioned above, the trend has been to directly link the rotating output shaft of an electric motor to a mechanical device which converts the rotational motion into reciprocal or linear motion. The most common method is to use a lead screw coupled directly to the motor output shaft with a follower unit traveling along the threads of the lead screw.

The motor/lead screw combination addresses some of the difficulties of a fluid powered system. However, at the point of application of the reciprocating motion, this combination requires considerably more space. Typical prior art arrangements also result in exposure of the threaded components and/or nonconcentric connection of the lead screw and follower assembly to the load.

An example of one prior art system is disclosed in U.S. Pat. No. 2,683,379 (Strandgren) in which a reciprocating member is enclosed by a threaded drive element. Typically, a motor assembly is coupled to an end of such a drive element contributing to the overall length of the actuator unit.

U.S. Pat. No. 3,660,704 (Paine et al.) discloses a motor concentrically mounted about a threaded drive element. This reduces the length of the actuator assembly unit in short stroke applications, and encloses the threads. However, it substantially lengthens the actuator in long stroke applications since a smooth section equal in length to the threaded section must be included in order for the actuator shaft to slide through the bushing.

SUMMARY OF THE INVENTION

The present invention provides an electrically powered, bi-directional linear actuator of relatively small size (length and diameter) in which the threads of the drive member and its follower are not exposed and where all force bearing components are concentrically connected to a load. The actuator includes an actuator assembly having an output shaft, an electric motor assembly (having a stator) and a housing assembly. An armature drive cylinder is formed as an elongated cylinder of a magnetic material and is rotationally supported relative to the housing assembly. The elongated cylinder has permanent magnets mounted about the circumference to form an armature within the motor assembly and has an internally threaded bore that forms a drive cylinder within the actuator assembly.

The output shaft of the actuator assembly is moved between retracted and extended positions by the electric motor assembly. Specifically, rotation of the armature drive cylinder under the influence of the stator's magnetic forces produces a corresponding rotation of the armature drive cylinder threaded bore. Engagement of the threads of the armature drive cylinder with those of the output shaft assembly produces a corresponding linear movement in the output shaft. The thread engaging portion of the actuator assembly is significantly shorter than the extent of the threaded bore of the armature drive cylinder with that difference in length defining a maximum actuation stroke of the actuator.

DETAILED DESCRIPTION OF THE PREFERRED EMBODIMENTS

Figure 1:
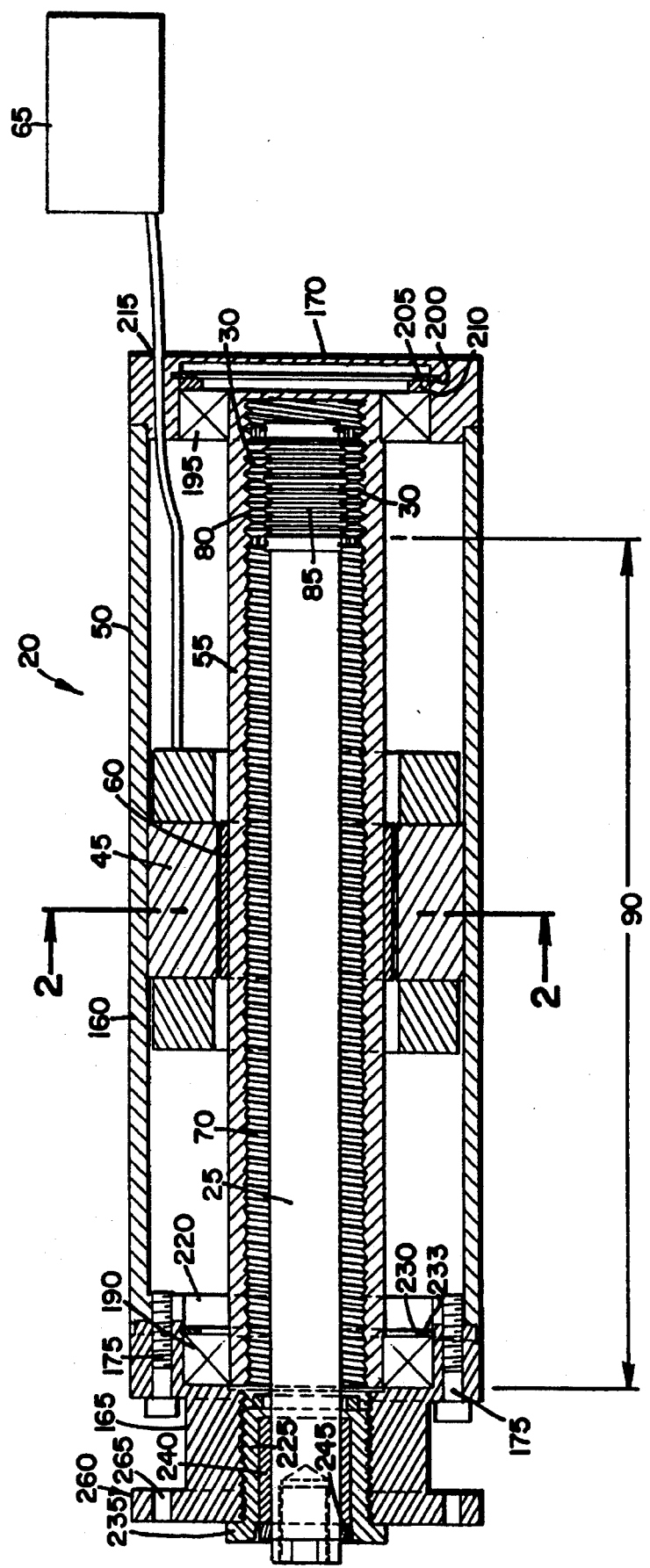
FIG. 1 is a sectional view along the axial length of a first embodiment of a linear actuator in accordance with the present invention.
Figure 2:
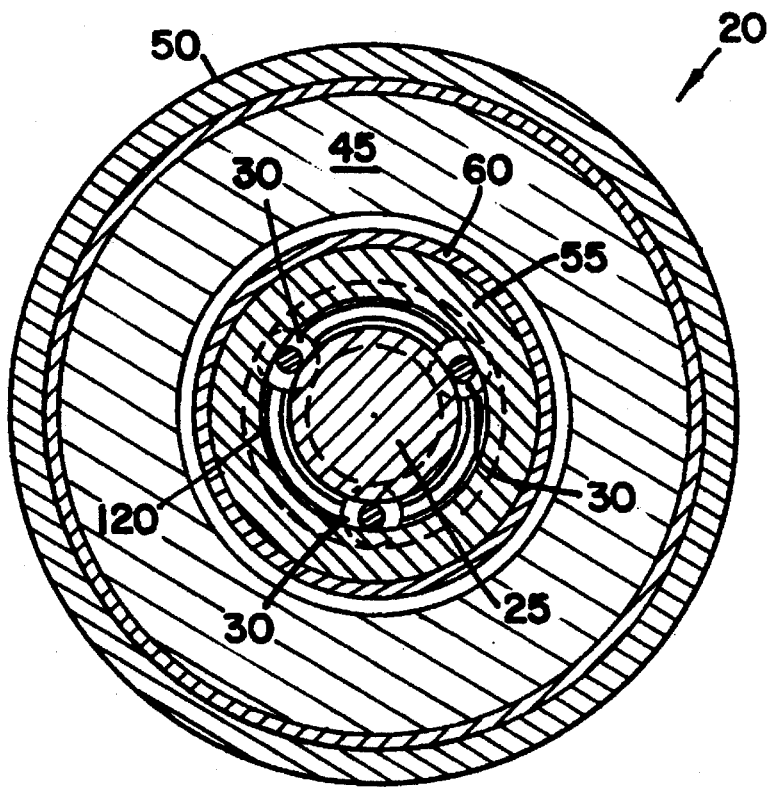
FIG. 2 is a sectional view as taken along line 2—2 of FIG. 1.
Figure 3:
FIG. 3 is an enlarged detailed view of a portion of FIG. 1.

A preferred embodiment of a linear actuator in accordance with the present invention is shown in FIGS. 1—3 (designated generally at 20) and includes an actuator assembly (including an output shaft 25 and a plurality of transmission rollers 30), an electric motor assembly (including a stator 45) and a housing assembly 50. The motor assembly moves the output shaft 25 between a retracted position (shown in FIG. 1) and an extended position (not shown) and includes an elongated cylinder 55 formed of a magnetic material rotatably supported relative to the housing assembly 50. Magnets 60 are mounted about an outer surface of the cylinder 55 to form an armature (with the cylinder 55) within the motor assembly. The stator 45 is attached to and supported by the housing assembly 50 and encircles the cylinder 55. An external control 65, of any known type, selectively energizes the stator 45 to rotate the armature (clockwise or counterclockwise).

The elongated cylinder 55 includes a central threaded bore 70 the threads of which are engaged by the transmission rollers 30. The output shaft 25 is coupled with the transmission rollers 30 to move along the threaded bore 70 on rotation of the cylinder 55. Thus, the elongated cylinder 55 forms a drive cylinder within the actuator assembly, as well as forming the armature of the motor assembly. Accordingly, the elongated cylinder 55 is referred to herein as the armature drive cylinder.

The output shaft 25 and the transmission rollers 30 are axially aligned within the threaded bore 70 of the armature drive cylinder 55. The transmission rollers 30 are spaced around a portion of the output shaft 25 (See FIG. 2) and include annular ribs or rings 80 which extend along the axial extent thereof (See FIG. 3). The rings 80 define camming surfaces which are engaged by the threaded bore 70 of the armature drive cylinder 55 to move the actuator assembly along the threaded bore 70 in response to the rotation of the armature drive cylinder 55. The extent of threaded bore 70 within the armature drive cylinder 55 defines a track along which the transmission rollers 30 of the actuator assembly move.

A portion of the output shaft 25 includes annular rings 85 which are engaged by the annular rings 80 of the transmission rollers 30 to advance the output shaft 25. Thus, as described, when the armature drive cylinder 55 is selectively rotated (clockwise or counterclockwise) by the stator 45, the threaded bore 70 engages the annular rings 80 of the transmission rollers 30 to selectively move the transmission rollers 30 along the threaded extent 70 of the armature drive cylinder 55. The annular rings 80 of the transmission rollers 30 engage the annular rings 85 of the output shaft 25 to move the output shaft 25.

The thread engaging portion of the actuator assembly (as defined by the annular rings 80 of the transmission rollers 30) is significantly shorter than the extent of the internal threads within the armature drive cylinder 55 such that the difference between them defines a maximum actuation stroke 90. Since the extent of the thread engaging portion (annular rings 80 of the transmission rollers 30) is significantly small as compared to the extent of the threads within the armature drive cylinder 55 and since the motor assembly is positioned around the output shaft 25, the length of the cylinder 55 closely approximates the maximum extent of the actuation stroke 90 and the length of the actuator 20. Also, the thread engaging portion (annular rings 80 of the transmission rollers 30) and the annular rings 85 of the actuator assembly are maintained within the armature drive cylinder 55 during the entire actuation stroke 90. Thus, the interactive parts of that assembly are self-protected during the entire stroke of the actuator. In addition, since only a "smooth" portion of the output shaft 25 extends outside the threaded bore 70, a forward end of the bore 70 can be easily sealed to define a protected chamber for the interacting elements of the device.

As illustrated in FIG. 2, at least three transmission rollers 30 are used. The transmission rollers 30 are mounted for rotation about the output shaft 25 and include forward and rear support axle extensions 100 and 110 which cooperate with forward and rear support rings 120 and 125, respectively (FIGS. 2 & 3). Each of the forward and rear support rings 120 and 125 include support holes 126 which accept one of the extensions 100, 110. The number of support holes 126 on each of the forward and rear support rings 120 and 125 corresponds to the number of transmission rollers 30. The forward support axle extensions 100 of each of the transmission rollers 30 extend through a support hole 126 of the forward support ring 120. Likewise, the rear support axles 110 of each of the transmission rollers 30 extend through a support hole 126 of the rear support ring 125. Thus, the forward and rear support rings 120 and 125 maintain the spacing of the transmission rollers 30 about the output shaft 25 during operation. The axle extensions 100 and 110 are secured within the holes 126 of support rings 120 and 125 in any known manner.

As shown in FIG. 1, the housing assembly 50 includes a cylindrical tube 160 an end cap 165, and a circular end seal 170. The end cap 165 is mounted to a first end of the cylindrical tube 160 by bolts 175 and the circular end seal 170 is mounted to a second end of the cylindrical tube 160, as by a proper fit.

The stator 45 of the motor assembly is mounted about an inner surface of the cylindrical tube 160. The armature drive cylinder 55 is rotationally supported relative to the housing assembly 50 by front and rear bearings 190 and 195, respectively. The rear support bearing 195 is mounted to an internal surface of the circular end seal 170 to rotationally support a rear portion of the armature drive cylinder 55. The circular end seal 170 includes a circumferential groove 200 within which is maintained a retaining ring 205. A bumper 210 is interposed and held in place between the retaining ring 205 and the bearing 195 to absorb energy when the actuator assembly reaches the retracted position at the rear end of the threaded bore 70 thereof. The circular end seal 170 includes a wire opening 215 for electrically connecting the external control 65 to the stator 45.

The end cap 165 is formed of a stepped cylindrical member having a stepped central bore defining a first bore portion 220 and a second bore portion 225, the diameter of the first bore portion 220 being larger than the diameter of the second bore portion 225. The front bearing 190 is mounted within the first bore portion 220 of the end cap 165 to rotationally support a front portion of the armature drive cylinder 55. The end cap 165 includes a circumferential groove 230 which maintains a front retainer ring 233 to secure the front bearing 190 relative to the housing assembly 50. 10 The second bore portion 225 of the end cap 165 is internally threaded. An externally threaded tubular bushing support 235 is seated within the internally threaded second bore portion 225 of the end cap 165. The bushing 240 is concentrically positioned within the bushing support 235 to support the output shaft 25 at a forward (output) end of the housing assembly 50. A ring seal 245 is included at a forward end of the bushing 240.

The end cap 165 includes a flange portion 260 having screw holes 265 for attachment to a mounting surface. The output shaft 25 is designed to receive an extension (not shown) and includes an internally threaded bore at an extended end.

Figure 4:
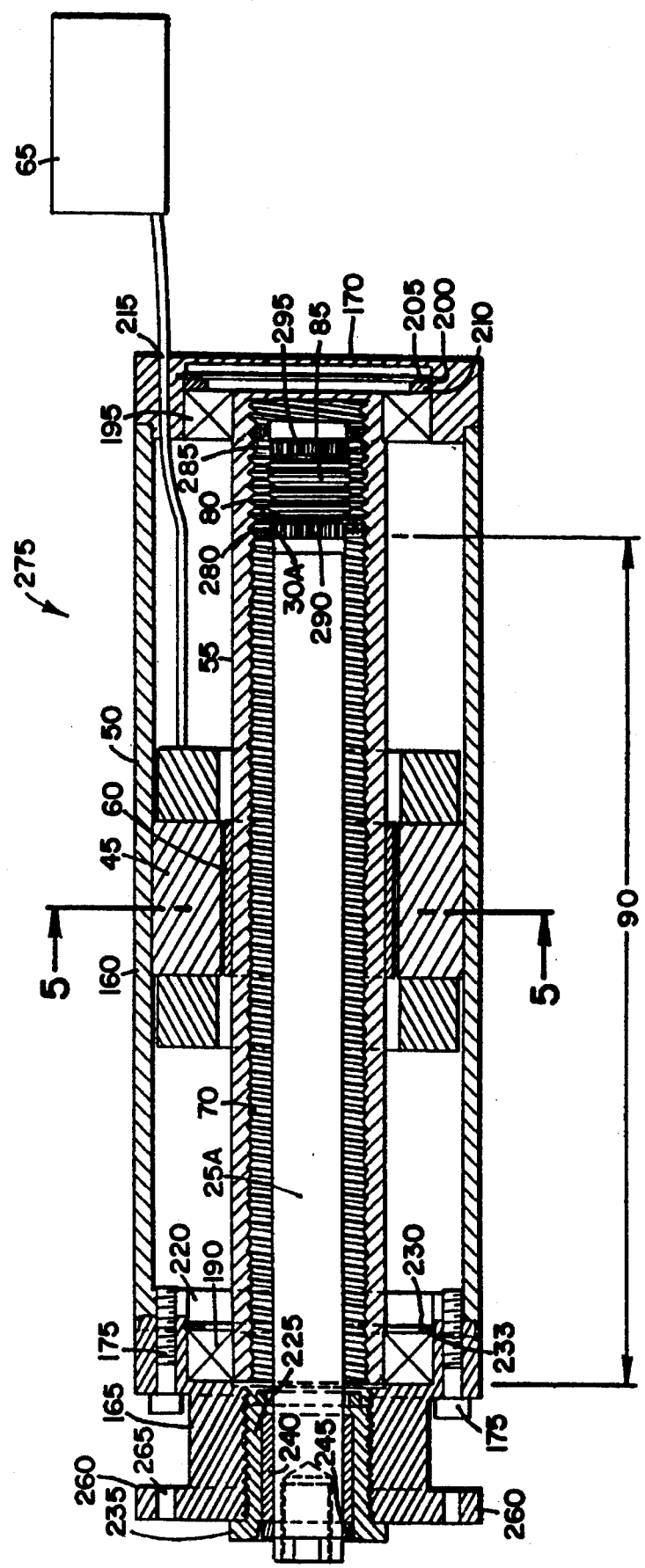
FIG. 4 is a sectional view along the axial length of another embodiment of a linear actuator in accordance with the present invention.
Figure 5:
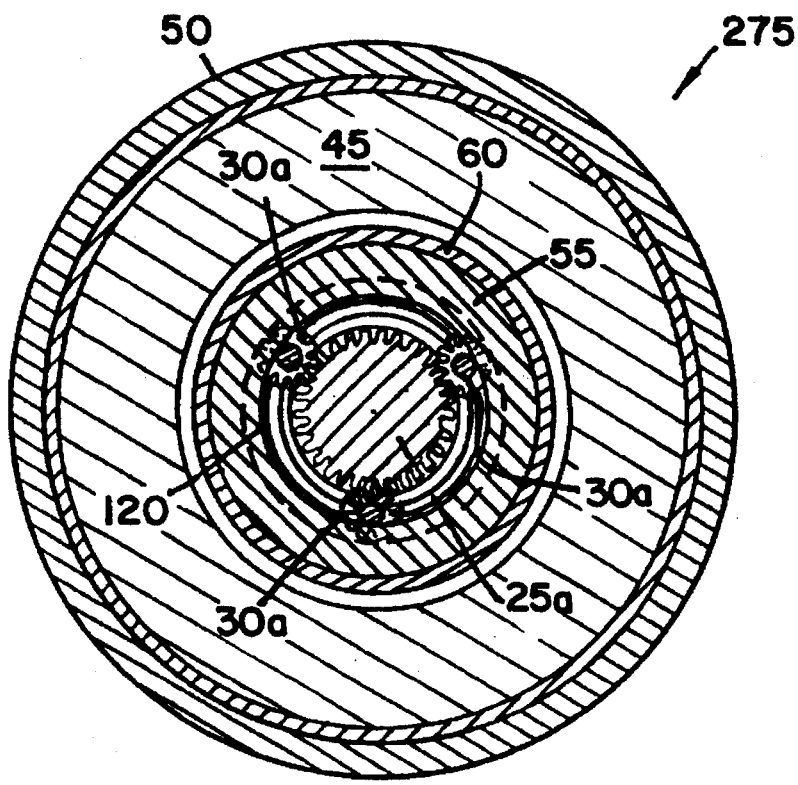
FIG. 5 is a sectional view as taken along line 4—4 of FIG. 3.
Figure 6:
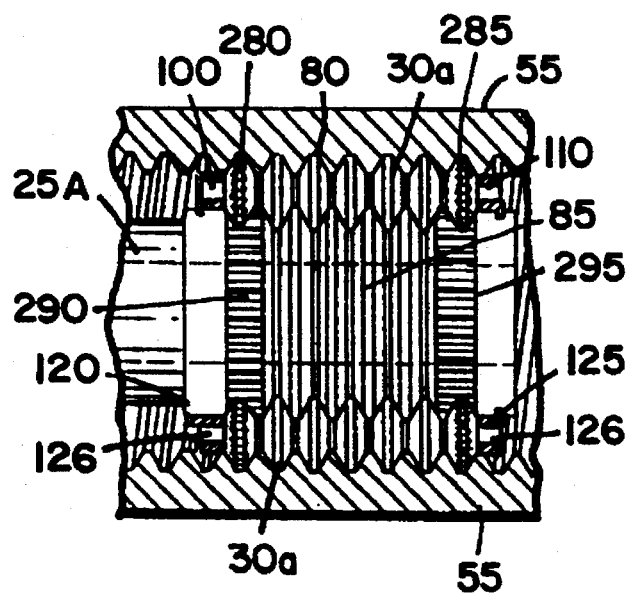
FIG. 6 is an enlarged detailed view of a portion of FIG. 4

FIGS. 4–6 illustrate another preferred embodiment of a linear actuator 275 in accordance with the present invention. As shown, in FIGS. 4–6, the linear actuator 275 is similar to the linear actuator 20 of FIGS. 1–3 and has many of the same components. The reference numbers used in FIGS. 1–3 are used to identify like components in FIGS. 4–6. As shown in FIGS. 4–6, actuator 275 differs from the embodiment of FIGS. 1–3 in that the transmission rollers 30A of the actuator assembly include forward and rear gear teeth 280 and 285. Further, the output shaft 25A (about which the transmission rollers 30A are positioned) includes forward and rear gear teeth 290 and 295, respectively. The forward and rear gear teeth 280 and 285 of the transmission rollers 30A mesh with the respective forward and rear gear teeth 290 and 295 of the output shaft 25A to maintain the relative position of the rollers 30A while the output shaft 25A moves along the threaded bore 70 of the armature drive cylinder 55. The interaction of the gear teeth 280, 285 of the transmission rollers 30A and the gear teeth 290, 295 of the output shaft 25A prevents slippage therebetween.

Figure 7:
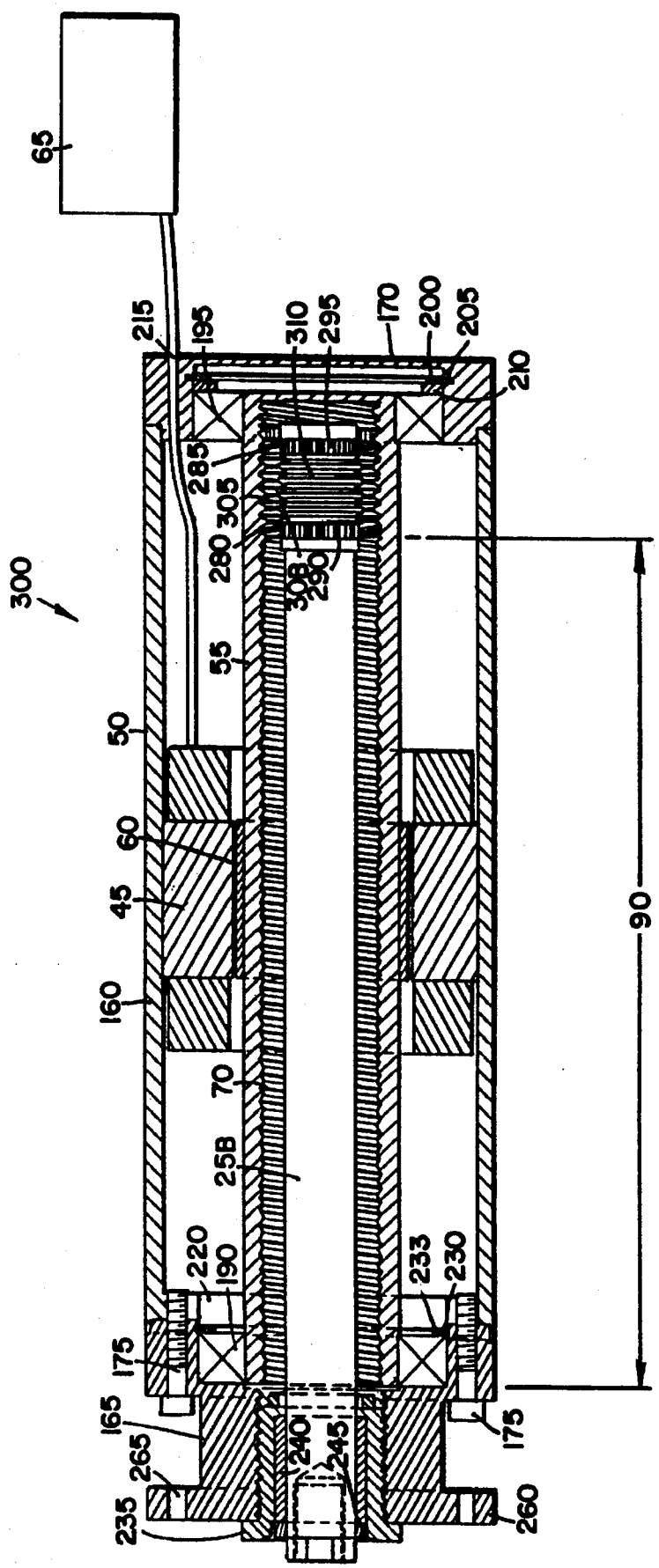
FIG. 7 is a sectional view along the axial length of a further embodiment of a linear actuator in accordance with the present invention.
Figure 8:
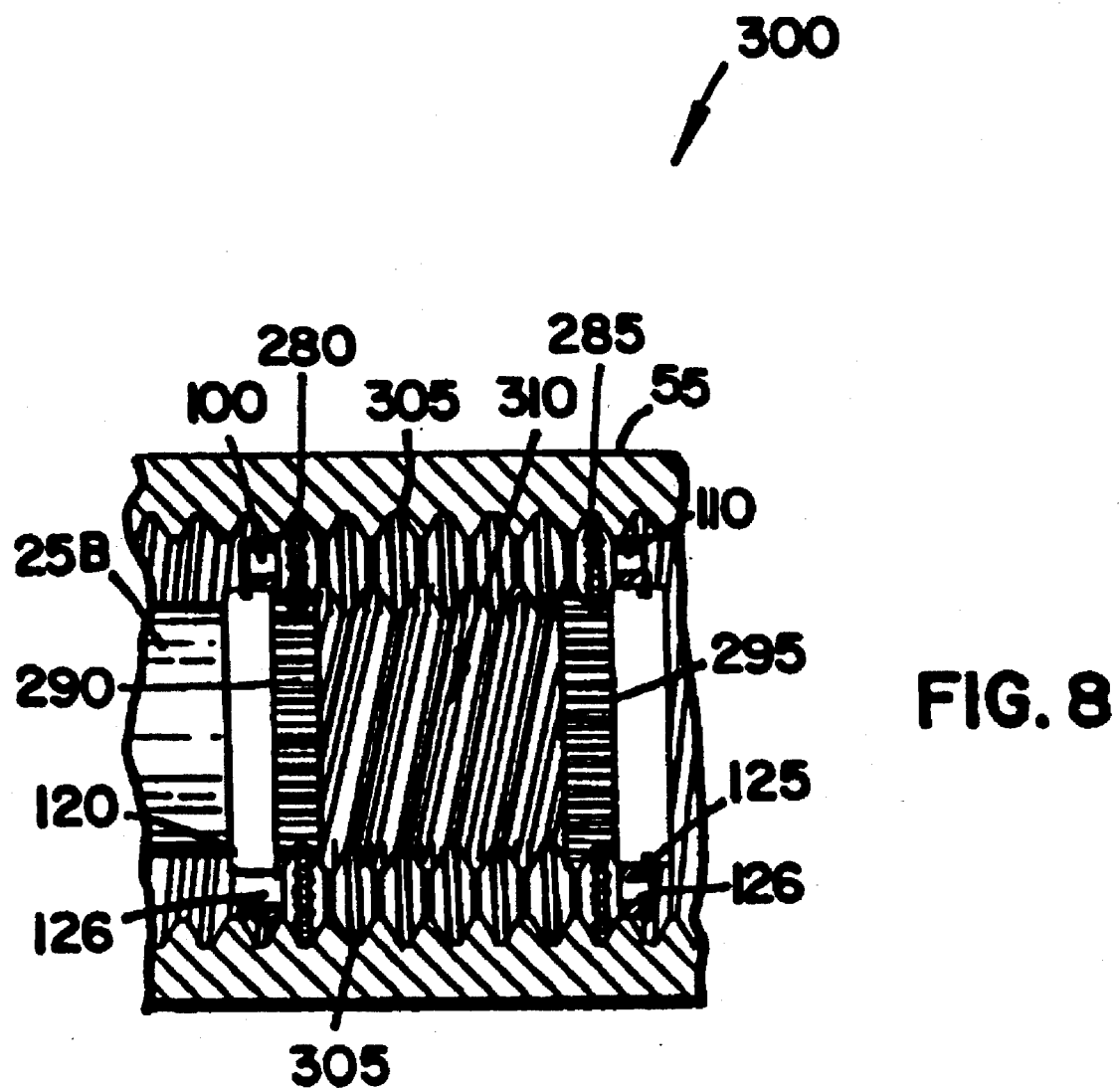
FIG. 8 is an enlarged detailed view of a portion of FIG. 7.

FIGS. 7 and 8 illustrate a further embodiment of a linear actuator 300 in accordance with the present invention. The linear actuator 300 is similar to linear actuator 275 (FIGS. 4–6) and, as such, like numbers have been used to identify like parts. However, in the linear actuator 300 of FIGS. 7 and 8, the camming surfaces of the transmission rollers 30B are defined by threads 305 instead of annular rings as shown in the first and second embodiments. Likewise, the portion of the output shaft 25B (about which the transmission rollers 30B are spaced) includes threads 310 instead of annular rings as in the embodiments of FIGS. 1–6 which are engaged by the threads 305 of the transmission rollers 30B. In operation, the threads of the bore 70 of the armature drive cylinder 55 engage the threads 305 of the transmission rollers 30B to move the transmission rollers 30B on rotation of the cylinder 55. The threads 305 of the transmission rollers 30B likewise engage the threads 310 of the output shaft 25B to correspondingly move the output shaft 25B in cooperation with the transmission rollers 30B.

Although the present invention has been described with reference to preferred embodiments, workers skilled in the art will recognize that changes may be made in form and detail. For example, the output shaft "25" may be formed with rings or threads which directly engage the threads of the threaded bore 70 of the armature drive cylinder 55. Sensors may be employed to detect the position of the output shaft, that information being used in control systems of known design. Also, other motor designs and types may be adapted to the practice of the present invention. These and other changes within the scope of the appended claims are anticipated by the present invention.

What is claimed is:

1. An electrically powered linear actuator comprising:
   (a) a housing assembly;
   (b) an energizable stator supported by the housing assembly;
   (c) elongated cylinder means of a magnetic material having means mounted about an outer circumference thereof for forming an armature with the cylinder means, the elongated cylinder means having an internally threaded bore to thereby define an armature drive cylinder;
   (d) means for rotatably supporting the cylinder means relative to the housing assembly; and
   (e) an actuator assembly including an output shaft and a thread engaging portion operably coupled with the threaded bore of the cylinder means, the thread engaging portion being moved along the threaded bore of the cylinder means to provide bidirectional linear movement of the output shaft, the extent of the thread engaging portion being smaller than the extent of the internal threads extending along the cylinder means such that the difference therebetween defines a maximum actuation stroke for the actuator assembly, wherein the thread engaging portion of the actuator assembly comprises:
      (i) a plurality of transmission rollers circumferentially spaced about a portion of the output shaft and axially aligned therewith, the rollers including camming surfaces, the internal threads of the cylinder means contacting the camming surfaces to move the transmission rollers along the threaded extent of the cylinder means in response to the selective rotation of the armature drive cylinder; and
      (ii) surfaces along a portion of the output shaft which are engaged by the camming surfaces of the transmission rollers to cooperatively move the output shaft along the threaded extent of the cylinder means in combination with the transmission rollers, wherein the force transferred to the transmission rollers is directly transferred to the output shaft.

2. The actuator of claim 1 wherein the extent of the internal threads along the length of the cylinder means is significantly longer than the extent of the thread engaging portion to define a significantly long stroke for the actuator.

3. The actuator of claim 1 and further including means for maintaining the circumferential spacing for the transmission rollers about the output shaft during operation.

4. The actuator of claim 1 wherein the camming surfaces of the transmission rollers are annular rings which are engaged by the internal threads of the cylinder means.

5. The actuator of claim 4 wherein the output shaft includes annular rings about which the transmission rollers are positioned, the annular rings of the transmission rollers engaging the annular rings of the output shaft to move the output shaft along the threaded cylinder means in cooperation with the transmission rollers.

6. The actuator of claim 1 wherein the camming surfaces of the transmission rollers are threads which are engaged by the internal threads of the cylinder means.

7. The actuator of claim 6 wherein a portion of the output shaft is threaded, the threads of the transmission rollers engaging the threads of the output shaft.

8. The actuator of claim 3 wherein the means for maintaining the circumferential spacing for the transmission rollers about the output shaft during operation includes support rings, cooperatively connected to the output shaft, having support holes defined therein for rotatably mounting the transmission rollers.

9. The actuator of claim 8 wherein the camming surfaces of the transmission rollers are annular rings which are engaged by the internal threads of the cylinder means to move the transmission rollers along the threaded extent of the cylinder means.

10. The actuator of claim 9 wherein the surfaces of the output shaft are formed of annular rings.

11. The actuator of claim 8 wherein the camming surfaces of the transmission rollers are threads which are engaged by the internal threads of the cylinder means to move the transmission rollers along the threaded extent of the cylinder means.

12. The actuator of claim 11 wherein the surfaces of the output shaft are formed of threads.

13. The actuator of claim 1 and further including:
   (a) gear teeth on opposed ends of the portion of the output shaft; and
   (b) gear teeth on opposed ends of the transmission rollers wherein the gear teeth of the transmission rollers cooperative with the gear teeth of the output shaft to maintain the relative position of the transmission rollers as the output shaft moves along the threaded bore of the cylinder means.

14. An electrically powered linear actuator, comprising:
   (a) a housing assembly;
   (b) an energizable stator supported by the housing assembly;
   (c) an elongated cylinder having an internally threaded bore, wherein the cylinder includes magnetic material mounted about an outer circumference thereof for forming an armature together with the cylinder and the cylinder is rotatably mounted within the housing assembly;

(d) an output shaft oriented coaxially with the elongated cylinder, the output shaft including a cam engaging surface and support rings cooperatively connected at opposing ends of the cam engaging surface, the cam rings having support holes defined therein; and (e) a plurality of transmission rollers rotatably mounted between the support rings by the support holes, wherein the transmission rollers are axially aligned with the output shaft and include camming surfaces in operative engagement with the threaded bore of the cylinder and the cam engaging surface of the output shaft, wherein when the cylinder rotates and the output shaft is not allowed to rotate, then the transmission rollers move along the threaded bore of the cylinder and directly transfer the movement and force to the output shaft providing bidirectional linear movement to the output shaft.

15. The actuator of claim 14 wherein the camming surfaces of the transmission rollers are annular rings which are engaged by the internal threaded bore of the cylinder to move the transmission rollers along the threaded extent of the cylinder.

16. The actuator of claim 14 wherein the camming surfaces of the transmission rollers are threads which are engaged by the internal threaded bore of the cylinder to move the transmission rollers along the threaded extent of the cylinder.

17. The actuator of claim 15 and further including:

(a) gear teeth on opposed ends of the cam engaging surface of the output shaft; and (b) gear teeth on opposed ends of the transmission rollers, wherein the gear teeth of the transmission rollers cooperatively engage the gear teeth of the output shaft to maintain the relative position of the transmission rollers as the output shaft moves along the threaded bore of the cylinder.

18. The actuator of claim 16 and further including:

(a) gear teeth on opposed ends of the cam engaging surface of the output shaft; and (b) gear teeth on opposed ends of the transmission rollers wherein the gear teeth of the transmission rollers cooperatively engage the gear teeth of the output shaft to maintain the relative position of the transmission rollers as the output shaft moves along the threaded bore of the cylinder.

19. An electrically powered linear actuator, comprising:

(a) a generally cylindrically shaped housing assembly;

(b) an energizable stator supported by the housing assembly;

(c) an armature drive cylinder comprised of an elongated cylinder with magnetic material mounted about an outer circumference, the elongated cylinder including an internally threaded bore, wherein the armature drive cylinder is rotatably mounted within the housing assembly;

(d) an output shaft coaxially aligned with the armature drive cylinder and including a thread engaging portion about the periphery of the output shaft, wherein the extent of the thread engaging portion is smaller than the extent of the internally threaded bore of the elongated cylinder, whereby the difference therebetween defines a maximum actuation stroke for the output shaft; and (e) a plurality of transmission rollers rotatably mounted to the output shaft in an axial alignment with the longitudinal axis of the output shaft, wherein the transmission rollers include camming surfaces in operative engagement with the threaded bore of the cylinder and the thread engaging portion of the output shaft, and wherein when the cylinder rotates and the output shaft is not allowed to rotate, then the transmission rollers move along the threaded bore of the cylinder and directly transfer the movement and force to the output shaft providing bidirectional linear movement to the output shaft.

20. The actuator of claim 19 and further (a) gear teeth on opposed ends of the thread engaging portion of the output shaft; and (b) gear teeth on opposed ends of the transmission rollers, wherein the gear teeth of the transmission rollers cooperatively engage the gear teeth of the output shaft to maintain the relative position of the transmission rollers as the output shaft moves along the threaded bore of the cylinder.

* * * * *

UNITED STATES PATENT AND TRADEMARK OFFICE
CERTIFICATE OF CORRECTION

PATENT NO. :   5,491,372

DATED      :   February 13, 1996

INVENTOR(S) :  Timothy A. Erhart

It is certified that error appears in the above-identified patent and that said Letters Patent is hereby corrected as shown below:

On column 4, line 40, please delete "10" after the numeral "50."

On column 4, line 40, "The second" should start a new paragraph.

On column 8, line 36 (claim 20), please insert --including:-- after the word "further"

Signed and Sealed this

Eighteenth Day of June, 1996

Attest:

BRUCE LEHMAN

Attesting Officer        Commissioner of Patents and Trademarks